United States Patent
Sabins et al.

(10) Patent No.: US 10,378,299 B2
(45) Date of Patent: Aug. 13, 2019

(54) METHOD OF PRODUCING RESIN COMPOSITE WITH REQUIRED THERMAL AND MECHANICAL PROPERTIES TO FORM A DURABLE WELL SEAL IN APPLICATIONS

(71) Applicant: CSI Technologies LLC, Houston, TX (US)

(72) Inventors: Freddie Lynn Sabins, Spring, TX (US); Jorge Esteban Leal, Houston, TX (US); Larry Thomas Watters, Spring, TX (US)

(73) Assignee: CSI TECHNOLOGIES LLC, Houston, TX (US)

( * ) Notice: Subject to any disclaimer, the term of this patent is extended or adjusted under 35 U.S.C. 154(b) by 0 days.

(21) Appl. No.: 15/617,976

(22) Filed: Jun. 8, 2017

(65) Prior Publication Data

US 2018/0355692 A1 Dec. 13, 2018

(51) Int. Cl.
*E21B 33/138* (2006.01)
*E21B 33/00* (2006.01)
(Continued)

(52) U.S. Cl.
CPC .............. *E21B 33/00* (2013.01); *C01B 32/20* (2017.08); *C01F 7/02* (2013.01); *C01G 45/02* (2013.01);
(Continued)

(58) Field of Classification Search
CPC ......... C04B 28/32; C04B 40/00; C09K 8/508; C09K 8/80; C09K 8/5751; C09K 8/506;
(Continued)

(56) References Cited

U.S. PATENT DOCUMENTS 2,495,352 A 1/1950 Smith
3,308,884 A 3/1967 Robichaux
(Continued)

FOREIGN PATENT DOCUMENTS

EP 2363573 A1 9/2011
EP 2826761 A1 1/2015
(Continued)

OTHER PUBLICATIONS

Ellis, Bryan, "Chemistry and Technology of Epoxy Resins", Springer Science-FBusiness Media, 1993, pp. 1-71.
(Continued)

*Primary Examiner* — Zakiya W Bates
(74) *Attorney, Agent, or Firm* — Patterson + Sheridan, LLP

(57) ABSTRACT

In one embodiment of this disclosure, method of formulating a sealant to span an opening and form a seal with surfaces across the opening is provided. The method further includes selecting a fluid material capable of contacting and adhering to the surface of the opening and which reacts to form a solid material as a result of a thermal reaction. The method further includes selecting and intermixing one or more solids with the fluid material to form a composite, wherein the composite cures from a fluid to a solid and bond to the surfaces of the opening and the change in volume of the composite as the temperature thereof changes during curing is insufficient to cause it to pull away from the surfaces of the opening or fail internally.

13 Claims, 5 Drawing Sheets

(51) Int. Cl.

| | |
|---|---|
| C01B 32/20 | (2017.01) |
| C01F 7/02 | (2006.01) |
| C01G 45/02 | (2006.01) |
| C04B 28/04 | (2006.01) |
| C08G 59/02 | (2006.01) |
| C09K 8/42 | (2006.01) |
| C09K 8/44 | (2006.01) |
| C09K 8/467 | (2006.01) |
| C09K 8/504 | (2006.01) |
| C09K 8/508 | (2006.01) |
| C09K 8/516 | (2006.01) |
| C09D 163/00 | (2006.01) |
| C04B 26/14 | (2006.01) |

(52) U.S. Cl.
CPC ............. *C04B 26/14* (2013.01); *C04B 28/04* (2013.01); *C08G 59/02* (2013.01); *C09D 163/00* (2013.01); *C09K 8/422* (2013.01); *C09K 8/426* (2013.01); *C09K 8/44* (2013.01); *C09K 8/467* (2013.01); *C09K 8/508* (2013.01); *C09K 8/5045* (2013.01); *C09K 8/516* (2013.01)

(58) Field of Classification Search
CPC ...... C09K 8/575; C09K 8/685; C09K 8/5756; C09K 8/68; E21B 43/025; E21B 43/26; E21B 43/16; E21B 43/25; E21B 33/14; E21B 36/00; E21B 36/008
See application file for complete search history.

(56) References Cited

U.S. PATENT DOCUMENTS

| | | | |
|---|---|---|---|
| 3,416,604 A | 12/1968 | Rensvold | |
| 4,189,002 A | 2/1980 | Martin | |
| 4,526,232 A | 7/1985 | Hughson et al. | |
| 4,817,719 A | 4/1989 | Jennings, Jr. | |
| 5,295,541 A | 3/1994 | Ng et al. | |
| 5,314,023 A | 5/1994 | Dartez et al. | |
| 5,377,757 A | 1/1995 | Ng | |
| 5,484,020 A | 1/1996 | Cowan | |
| 5,503,227 A | 4/1996 | Saponja et al. | |
| 5,529,122 A | 6/1996 | Thach | |
| 5,531,272 A | 7/1996 | Ng et al. | |
| 5,649,594 A | 7/1997 | Flak et al. | |
| 5,833,001 A * | 11/1998 | Song ..................... | E21B 29/10 166/287 |
| 5,873,413 A | 2/1999 | Chatterji et al. | |
| 5,875,845 A | 3/1999 | Chatterji et al. | |
| 5,875,846 A | 3/1999 | Chatterji et al. | |
| 5,957,204 A | 9/1999 | Chatterji et al. | |
| 5,969,006 A | 10/1999 | Onan et al. | |
| 6,006,835 A | 12/1999 | Onan et al. | |
| 6,006,836 A | 12/1999 | Chatterji et al. | |
| 6,244,344 B1 | 6/2001 | Chatterji et al. | |
| 6,321,841 B1 | 11/2001 | Eoff et al. | |
| 6,478,088 B1 | 11/2002 | Hansen et al. | |
| 6,979,366 B2 | 12/2005 | Chatterji et al. | |
| 7,219,732 B2 | 5/2007 | Reddy | |
| 8,235,116 B1 | 8/2012 | Burts, Jr. et al. | |
| 8,240,387 B2 | 8/2012 | Hoffman et al. | |
| 8,703,659 B2 | 4/2014 | Dalrymple et al. | |
| 8,899,328 B2 | 12/2014 | Zamora et al. | |
| 9,522,981 B1 | 12/2016 | Dziwok et al. | |
| 2004/0211557 A1 | 10/2004 | Cole et al. | |
| 2004/0226717 A1 | 11/2004 | Reddy et al. | |
| 2005/0082066 A1 | 4/2005 | McGuire et al. | |
| 2005/0241855 A1 | 11/2005 | Wylie et al. | |
| 2005/0263282 A1 | 12/2005 | Jeffrey et al. | |
| 2005/0269080 A1 | 12/2005 | Cowan | |
| 2007/0163783 A1 | 7/2007 | Head | |
| 2007/0187097 A1 | 8/2007 | Weaver et al. | |
| 2007/0209797 A1 | 9/2007 | Brink et al. | |
| 2008/0023205 A1 | 1/2008 | Craster et al. | |
| 2008/0135251 A1 | 6/2008 | Nguyen et al. | |
| 2008/0264637 A1 | 10/2008 | Burts et al. | |
| 2008/0277117 A1 | 11/2008 | Burts, Jr. et al. | |
| 2008/0302542 A1 | 12/2008 | Pessin et al. | |
| 2008/0318812 A1 | 12/2008 | Kakadjian, Sr. et al. | |
| 2009/0078418 A1 | 3/2009 | Dusterhoft | |
| 2009/0078419 A1 | 3/2009 | Dusterhoft | |
| 2009/0149354 A1 | 6/2009 | Dajani et al. | |
| 2009/0253594 A1 | 10/2009 | Dalrymple et al. | |
| 2009/0301720 A1 | 12/2009 | Edwards et al. | |
| 2010/0051266 A1 | 3/2010 | Roddy et al. | |
| 2010/0116504 A1 | 5/2010 | Hoffman et al. | |
| 2010/0122650 A1 | 5/2010 | Hoffman et al. | |
| 2011/0088916 A1 | 4/2011 | Heijnen | |
| 2011/0192594 A1 | 8/2011 | Roddy et al. | |
| 2011/0199228 A1* | 8/2011 | Roddy .................... | E21B 33/13 340/856.4 |
| 2011/0203795 A1 | 8/2011 | Murphy et al. | |
| 2011/0277996 A1 | 11/2011 | Cullick et al. | |
| 2011/0284247 A1 | 11/2011 | Zamora et al. | |
| 2011/0290501 A1 | 12/2011 | Duncan et al. | |
| 2012/0328377 A1 | 12/2012 | Brenneis et al. | |
| 2013/0118752 A1 | 5/2013 | Hannegan et al. | |
| 2013/0233551 A1 | 9/2013 | Lin et al. | |
| 2013/0269948 A1 | 10/2013 | Hoffman et al. | |
| 2013/0284445 A1 | 10/2013 | Hughes | |
| 2013/0319671 A1 | 12/2013 | Lund et al. | |
| 2014/0048265 A1 | 2/2014 | Combs et al. | |
| 2014/0076563 A1 | 3/2014 | Lin et al. | |
| 2014/0213490 A1 | 7/2014 | Ogle et al. | |
| 2014/0251612 A1 | 9/2014 | Powers | |
| 2014/0262269 A1 | 9/2014 | Watters et al. | |
| 2014/0264822 A1 | 9/2014 | Horikiri et al. | |
| 2014/0299812 A1 | 10/2014 | Ozdoruk | |
| 2014/0357535 A1 | 12/2014 | Tang et al. | |
| 2014/0367105 A1 | 12/2014 | Karcher et al. | |
| 2016/0053158 A1 | 2/2016 | Roddy et al. | |
| 2016/0108305 A1 | 4/2016 | Murphy et al. | |
| 2016/0168030 A1 | 6/2016 | Teichert et al. | |
| 2018/0355237 A1 | 12/2018 | Sabins et al. | |

FOREIGN PATENT DOCUMENTS

| | | |
|---|---|---|
| EP | 3130746 A1 | 2/2017 |
| GB | 2407835 A | 5/2005 |
| WO | 01/90531 A1 | 11/2001 |
| WO | 2012057631 A1 | 5/2012 |
| WO | 2014200889 A1 | 12/2014 |
| WO | 2015034473 A1 | 3/2015 |
| WO | 2015034474 A1 | 3/2015 |
| WO | 2016024990 A1 | 2/2016 |

OTHER PUBLICATIONS

Hyne, Norman J.—Dictionary of Petroleum Exploration, Drilling, & Production, Jan. 1, 1991, PennWell Books, Tulsa, Oklahoma, XP055319754, ISBN: 978-0-87814-352-8, pp. 483-484.
Chegenizadeh Negin, "Most common surfactants employed in chemical enhanced oil recovery," Petroleum 3 (2017) 197-211.
Momentive, Technical Data Sheet, Silquest A-187, HCD-10052, 2018-03-13, 4 total pages.
EPO Extended European Search Report dated Oct. 18, 2018, for European Application No. 18176831.8.
Sabins, et al.; OA in related application U.S. Appl. No. 15/617,985 dated Nov. 15, 2018.
EPO Extended European Search Report dated Oct. 16, 2018 for European Application No. 18176832.6.

* cited by examiner

METHOD OF PRODUCING RESIN COMPOSITE WITH REQUIRED THERMAL AND MECHANICAL PROPERTIES TO FORM A DURABLE WELL SEAL IN APPLICATIONS

BACKGROUND OF THE INVENTION

Field of the Invention

Embodiments hereof relate to the sealing of wells used to produce hydrocarbons from subsurface formations penetrated thereby. More particularly, embodiments hereof relate to the formulation of sealants used to seal wells, and the application thereof at a location within a well to be sealed.

Description of the Related Art

Epoxy (resin introduced as a fluid and hardened in situ) is used as a specialty sealant in the upstream petroleum industry for repairing leaks originating in well barriers, i.e., to repair leaks in a cement sheath previously formed between sections of casing of different diameters, previously formed around the casing to seal between the casing and the earth of the drilled well bore, and previously formed at other locations of the well or casing. The leaks best suited to being repaired using epoxy resin, as opposed to using additional cement sealant, are usually small in cross-sectional area and difficult to access which makes the use of Portland cement, the traditional sealant for sealing well leaks, ineffective. Since epoxy resin is initially prepared in a fluid state by intermixing one or more resins and one or more hardener, with additives such as reaction accelerators and weighing agents, which mixture then reacts to harden and form a solid seal, it is ideally suited to be injected into small areas, such as pores or cracks in a previously formed Portland cement seal through which a leak is occurring, and allowed to set to form a seal to seal the cracks or pores in the previously placed seal material, and hence, the leak. Since epoxy in fluid form is cohesive in water or brine, an epoxy fluid formulated to be denser than well fluid can be introduced into a brine-filled casing or annulus well above a leak location in a well, below which a packer or other obstacle is set. The epoxy will fall to the bottom of the brine-filled space, where it will set and form a seal.

Volumetric penetration, i.e., the ability to enter into openings such as pores or cracks in a previously formed seal, or into a formation from which hydrocarbons have or may be produced, and the cohesion characteristics of epoxy resin when exposed to brine, make epoxy resin an ideal sealant for difficult well sealing applications in which remediation with Portland cement would require extensive well preparation (drilling, milling and cutting the casing, etc.) and large sealant volumes. Epoxy resin sealant can be locally mixed adjacent to the well location and placed therein using normal petroleum industry mixing and well introduction methods. Repairs of a failed or failing Portland cement well seal using an epoxy resin sealant usually requires significantly (as much as 10 times) less volume of sealant as compared to the sealant volume required when using additional Portland cement to repair a failed or failing Portland cement seal. This reduced volume of sealant is a consequence of epoxy resin's superior mechanical properties, its cohesiveness which inhibits contamination and intermixing therewith with other well fluids which degrades the resulting seal integrity, and its superior penetrating ability into small openings, as compared to Portland cement.

One detrimental feature of epoxy is that the setting of epoxy, i.e., the hardening thereof from a liquid to a solid form, is an exothermic chemical reaction, and because the epoxy has low thermal conductivity and low heat capacity, it experiences an increase in temperature after the resin and hardener are intermixed and the exothermic reaction there between initiates and progresses. The heat of this exothermic reaction can produce a large temperature increase in the epoxy as it sets, particularly when large volumes of resin contain a high hardener concentration required to obtain desirable setting times when the epoxy is used as a sealant in low-temperature (<100° F.) environments. For any given volume of epoxy in a cohesive fluid form, a given percentage increase in the volume of the fluid does not result in a corresponding same percentage increase in the surface area. Considering a sphere as an example, when the radius of the sphere is increased, the volume of the sphere increases as a cube of the radius, whereas the surface area increases as a square of the radius. Thus, as the volume of a batch of epoxy resin being mixed is increased, the ratio of surface area to volume decreases. Because the setting reaction is exothermic, as the volume of the batch of epoxy increases, more heat becomes trapped therein as the effective area through or from which heat transfer out of the batch must occur, i.e., the exterior surface, is a smaller relative percentage of the volume of the batch of epoxy resin. These same geometric results are inherent in the typical cylindrical or annular geometry of well seals, particularly those in large casings on the order of greater than 8 to 30 inches in diameter. In addition to the reaction of resin and hardener being exothermic, the reaction rate of hardener and resin is temperature dependent, and the higher the temperature of the batch of epoxy in fluid form, the faster the resin-hardener reaction occurs.

Temperature increase in the resin during the epoxy setting reaction is detrimental to forming a satisfactory epoxy seal in a well. Epoxy thermal properties exacerbate these detrimental effects. First, epoxy in both fluid and solid state has a high coefficient of thermal expansion. Second, the heat capacity of epoxy in both fluid and solid state is low; considerably lower than that of steel, Portland cement, or the subterranean earth formations around the well casing. Third, the thermal conductivity of epoxy resin is low compared to that of steel, Portland cement, or subterranean formations with which it must form sealing contact.

Plugging wells with epoxy sealants during abandonment operations typically requires placing large volumes (2 to 10 barrels) of mixed epoxy in fluid form in large-diameter casing (12 inches to 30 inches in diameter). These sealing applications are usually in offshore wells requiring high-performance plugs to seal the interior of the casing at the top of the well, close to the mud line. With ambient temperatures at this seal location ranging from 40° F. to 80° F., the setting reaction of the epoxy can self-generate a temperature increase in the volume of setting epoxy ranging from 200° F. to 400° F. As the temperature of the setting epoxy increases, the hardener-resin reaction rate increases resulting in further heat generation from the exothermic setting reaction. Thus, the thermal:mass:reaction rate effect is a chain reaction which can push the maximum temperature generated in a large volume of epoxy to significantly higher temperatures as it sets.

Because the resin-hardener reaction and reaction rate are temperature dependent, where epoxy is used to form a seal in a lower temperature region of the well, for example adjacent to the mudline to harden within a reasonable time period, the hardener concentration of the batch is increased and reaction accelerators are used to increase the setting reaction rate and thereby reduce the setting time of the batch. Increased hardener concentration to cause the resin-hardener reaction to occur faster at lower ambient temperatures further increases reaction rate and the maximum temperature reached by the batch or mix of epoxy.

In an example of the effect of the resin-hardener reaction on the temperature of the epoxy, a 4-gallon quantity of epoxy in a 5-gallon bucket qualifies as a large resin volume with low surface area to volume ratio. Four gallons of a resin formulation consisting of 100 parts resin, 30 parts diluent, 30 parts high-temperature hardener, 10 parts silane, and 7 parts reaction accelerator mixed at room temperature in a 5-gallon steel bucket and allowed to cure thereafter reached a maximum temperature at a location 2-inches inwardly of the bucket wall of 329° F., a temperature increase of 257° F. of the epoxy batch from the mixing temperature to the maximum temperature. The temperature of the epoxy at the center of mass thereof was substantially higher In known sealant designs, the sealant designer considers the temperature of the well at the sealing location thereof, the setting time of the resin-hardener and accelerator mixture as measured from the beginning of mixing, the mixing time of the batch of epoxy, and the time needed to pump the volume of the batch of epoxy that once mixed must be pumped to the sealing location, as the variables of the sealant design, also known as the sealant formulation, to be optimized. However, the exothermic nature of the resin-hardener reaction, in combination with the thermal properties of the epoxy, is detrimental to predictably forming a sealing plug with the use of epoxy. First, the hardener-accelerator combination reacts with the resin in such a way that maximum temperature is reached while the material is still in the fluid state. This reaction rate-solidification timing is the same when using low-temperature or high temperature hardener in the epoxy system, an epoxy system meaning a formulation of epoxy components for a specific sealing application. The epoxy thus heated begins solidifying shortly after the maximum temperature thereof is reached, and cools as the setting reaction continues and the epoxy further hardens. The epoxy also heats the adjacent casing with which it is to form a seal. The epoxy and the casing then slowly, over the course of 6-36 hours, cool back to the ambient well temperature. The Coefficient of Thermal Expansion (CTE) for set, i.e., hardened, epoxy is several times larger than that of steel, the most common material to which the epoxy must bond to form a sealing plug.

As the epoxy mixture sets, it also heats the adjacent steel to, or near to, the high resulting epoxy temperature at the interface of the steel and epoxy, and thereafter the set epoxy and the steel cool to the ambient temperature of the earth surrounding the sealing location. Because of the difference in coefficients of thermal expansion there between, during cooling from the epoxy reaction temperature to the ambient temperature, the epoxy (reacted resin-hardener mixture) contracts more than does the steel, thereby putting stress on the interfacial bond there between. In fact, in some cases of rapid setting epoxy formulations and thus rapid curing thereof, the stresses resulting from the contraction of the solidified epoxy as it cools results in the epoxy trying to pull away from the bonding surface thereof with the steel, which can generate internal cracks in the epoxy thereby forming a fluid leak path there through, or causes gaps or openings between the seal and the casing, or within the volume of the epoxy directly adjacent to the casing. Second, epoxy has a low heat capacity. Thus, the heat of reaction thereof drives the resultant temperature increase thereof higher than for materials with higher heat capacity. This attribute results in a greater temperature increase from the heat of reaction, thereby increasing the overall thermal contraction during cooling from that higher temperature and associated stresses.

Finally, having inherent low thermal conductivity, epoxy is a relatively good insulator slowing transfer of thermal energy there through, and particularly as the distance from the center of mass of the epoxy resin to the heat transfer boundary, i.e. the surface of the volume of epoxy, increases. This heat retention property also increases the maximum temperature that a large mass of curing epoxy resin will reach during the exothermic setting reaction.

Improving the CTE, heat capacity, and thermal conductivity properties of epoxy resins for applications requiring large fluid volumes at relatively low application temperatures would improve the sealing performance of epoxy sealants. The maximum temperature generated during curing could be reduced if the epoxy had a greater heat capacity, which would lower the temperature increase from the exothermic reaction, and a greater thermal conductivity, which would allow heat to flow from the volume of epoxy more quickly. A lower coefficient of thermal expansion of the hardened epoxy would result in less shrinkage of the epoxy volume, and less stress on the epoxy to casing seal. However, simply designing an epoxy formulation to minimize CTE while maximizing heat capacity and thermal conductivity is not sufficient to ensure formation of a durable well seal.

SUMMARY

A composite epoxy sealant provided herein contains a blend of solid particulate materials designed to maximize the sealant's thermal conductivity and heat capacity while minimizing the CTE thereof to improve sealant bonding in low-temperature applications. In one aspect, methods to assess the reaction kinetics and strength development profile of specific epoxy-solids composites under specific well conditions and seal geometries are provided, so that the thermal properties of the epoxy-solids composite can be optimized to allow epoxy based sealants to be formulated over a range of well conditions, potential epoxy materials, and potential solid particulate materials. Likewise, methods to assess the reaction kinetics and strength development profile of specific Portland cement-solids and non-epoxy thermosetting resin-solids composites under specific well conditions and seal geometries are provided, so that the thermal properties of the Portland cement-solids composite can be optimized to allow epoxy based sealants to be formulated over a range of well conditions, potential epoxy materials, and potential solid particulate materials.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
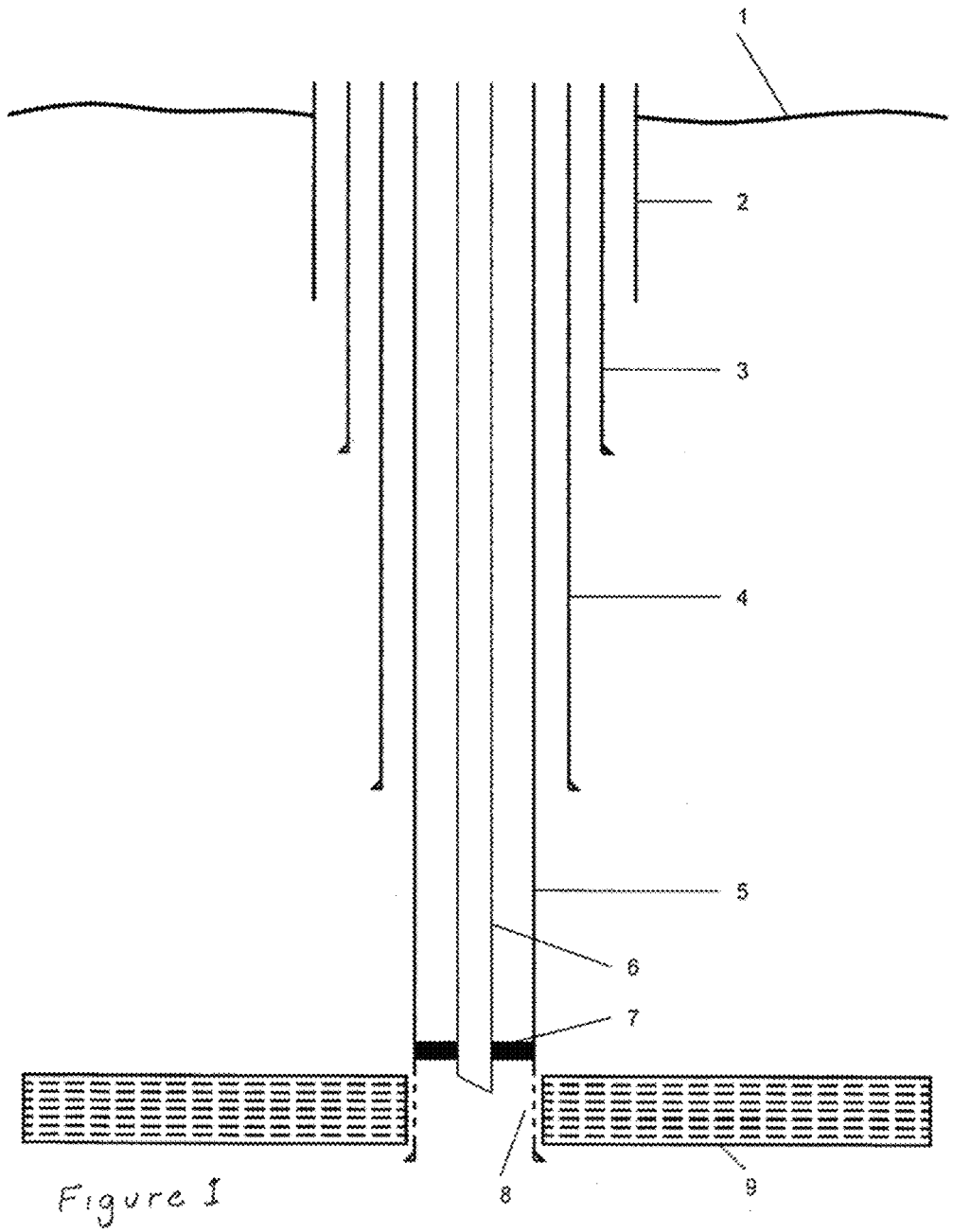
FIG. 1 is a schematic sectional view of an offshore well targeted for abandonment.

Herein, methods for the addition of particulate solids to a resin epoxy to form composite slurry that sets into a composite solid plug in the well, and specific such formulations, are described. The epoxy-solids composite is engineered so that the solids incorporated therein increase the heat capacity and thermal conductivity of the composite as compared to a traditional epoxy sealant, while lowering the CTE thereof as compared to a traditional epoxy sealant. Sufficient thermal property improvements of the epoxy-solids composite over a non-solids containing epoxy sealant are made to lower the peak temperature of the setting epoxy enough to prevent stress resulting from shrinkage of the cooling epoxy-solids composite from generating an internal failure of the seal or bond failure between the seal material and the casing. Herein, the reaction kinetics and strength development profile of the epoxy-solids composite plug remain sufficiently aggressive to ensure the composite material hardens to a strong, resilient barrier in an acceptable time even with a lower maximum temperature resulting from the exothermic resin-hardener reaction.

Solids are routinely added to well sealants to alter their density or control fluid phase permeation thereof. A well sealant having non-reacting solids content must be designed to produce a mixable, pumpable slurry. Other than to modify the resulting sealant density, wettability on mixing, and suspension stability, no design effort has been invested into the incorporation of solids into well sealants.

Herein, a method of estimating thermal properties and reaction kinetics behavior of a sealant-solids composite, in particular an epoxy-solids composite, to produce a durable seal for a composite epoxy sealant and epoxy based well seal application, is provided. The epoxy-solids composite is engineered from an epoxy resin-hardener-accelerator-additives composition with the addition of solid particulate materials that improve the thermal properties of the resulting epoxy-solids composite sealant as compared to a traditional epoxy sealant. Sealant performance criteria, and a method to design a composite sealant with appropriate thermal properties, reaction kinetics, and strength development profile using these performance criteria, are disclosed.

The improvement in sealant performance is derived from control of performance consequences arising from temperature increases produced by the exothermic setting reaction of the sealant. Solid particulate materials are chosen to allow wettability, mixability, and pumpability and sealablity of the sealant composite with maximum particulate loading. The thermal conductivity, heat capacity, and CTE of the solids are optimized by combining materials with desired particle size, density, and thermal properties to produce a stable, uniform composite sealant with thermal performance superior to that of a resin based epoxy sealant alone. Herein, the incorporation of solids with a resin epoxy sealant is discussed in detail, but the same principles apply to other thermosetting resins and for Portland cement sealant.

The first benefit derived from addition of solid particulate material to epoxy resin is dilution of the resin, i.e., a reduction of the percentage of resin in the total quantity of the epoxy-solids mixture as compared to a non-solids modified sealing mixture, in both solid and fluid form. Since the heat of reaction is a specific function of resin mass, lowering the mass of resin per unit volume of the composite mixture as mixed, and as applied to the sealing location, lowers the heat produced from the exothermic resin-hardener reaction per unit volume thereof, for example per cubic centimeter or cubic inch thereof. Where the same volume of an epoxy-solids composite is used in place of a traditional epoxy sealant, the dilution of the resin volume of the composite with inert solid particulates reduces the total thermal energy released in the epoxy-hardener reaction, thus reducing the maximum temperature increase of the composite.

The following three thermal property modifications provided by the solid particulates substantially alter the epoxy-solid composite's response to the evolved heat of the resin-hardener reaction. Table 1 below contains representative thermal property data for various materials. These data will be used to illustrate the benefits (additional to dilution) derived from use of the solid particulate material.

Table 1 data shows that cured epoxy resin has a relatively low heat capacity and a low thermal conductivity. As a result, heat generated by the setting reaction of the epoxy will cause the reaction temperature of the material to increase as the resin-hardener reaction goes forward. Additionally, because cured (solidified) epoxy without the added solid particulates has low thermal conductivity, heat transfer out of the mass of epoxy to cool the cured epoxy seal material is slow. In contrast, the coefficient of thermal expansion of the epoxy is relatively high. Thus, as epoxy sets and the resin-hardener reaction releases thermal energy, the temperature of the epoxy in the fluid state will increase significantly, and the heat of the resin-hardener reaction will be lost slowly (slow cool down plus higher ultimate temperature due to the insulating property of the epoxy). The resin-hardener reaction in epoxy mixes having large resin volumes with low surface area to volume ratios thereof produces a maximum mixture temperature while the resin is still in a fluid state. Thus, the resin solidifies (sets) at or near its maximum temperature. The high coefficient of thermal expansion would result in the set epoxy contracting, i.e., the volume thereof shrinks, significantly as it cools in the well as compared to other well materials if it were not also adhered to the casing(s) in the well. If the epoxy resin bonds to steel in the well to form the seal when both are at an elevated temperature, cooling will generate internal tensile stress in the resulting epoxy seal plug, and also stress at the bonding interface as the epoxy contracts more than the steel. This stress can generate cracks in the set epoxy, or break the bond at the epoxy:steel interface. Either of these failures will disrupt the seal and render it ineffective. Applicants have found, based on direct observation, that as a columnar volume of epoxy, for example a right circular volume of epoxy, sets or cures in contact with a material having a higher coefficient of thermal expansion and in a surrounding room temperature ambient, the conversion from fluid to solid occurs inwardly of the outer surface of the volume of epoxy, ultimately leaving a thin layer of fluid epoxy mixture surrounding a solidified volume of epoxy. As a result, as this thin layer solidifies, the stress of further shrinkage of the epoxy resin concentrates in this annular area, creating stresses capable of leaving an annular, or partially annular, gap region within or around the volume of set epoxy resin. Additionally, in some case, applicants have observed that in the volume of setting epoxy, a thin, set, layer can form along the outer surface thereof in contact with the higher heat transfer material such as the casing, and thus an annular area which is still fluid can remain between this set and solidified portion and the central set and solidified portion. In this case, cracking and voids will form in this final fluid area after it also sets and solidifies.

The addition of solid particulate materials to reduce these stresses requires solids with thermal properties complementary to those of epoxy. Preferably, a material added to the epoxy fluid mixture must be compatible with the epoxy ingredients and not interfere with the resin-hardener reaction which is fundamental to setting, and thus hardening, the epoxy, and have at least one of a higher heat capacity, a higher thermal conductivity, or a lower coefficient of thermal expansion than the epoxy fluid mixture into which it is added. More preferably, the added solid material should have two, or all three, of these thermal properties. For example, applicants have determined that hematite, a common oilfield weighting agent, has higher heat capacity, higher thermal conductivity, and lower coefficient of thermal expansion than solid epoxy. Therefore, a composite sealant containing epoxy and hematite will lower the exothermic temperature increase and lower the total contraction of the resulting set epoxy-solids composite after cooling. Examination of the thermal properties of other potential materials in particulate solid form set forth in Table 1 reveals several materials with one or two highly complementary thermal properties compared to sealing epoxy which also do not impact the epoxy resin-hardener reaction, and thus may be employed in an epoxy based well sealant mixture.

For example, graphite possesses an extremely high thermal conductivity and an extremely low coefficient of thermal expansion as compared to the epoxy sealant. Manganese oxide has a high heat capacity as compared to the epoxy sealant. Aluminum oxide has a high heat capacity and a low coefficient of thermal expansion as compared to the epoxy sealant.

TABLE 1

Thermal properties of epoxy resin compared to various solid weighting agents or diluents (water and air properties are provided for comparison).

| Material | Abbr. | Density ($kg/m^3$) | Thermal Conductivity (W/m ° K) | Volumetric Heat Capacity ($MJ/m^3K$) | CTE ($\mu$ in/in °K) |
|---|---|---|---|---|---|
| Epoxy Resin Solid | SEP | 1000 | 0.35 | 1.00 | 54.0 |
| Epoxy Resin Liquid | EP | 1000 | 0.35 | 2.09 | 54.0 |
| Steel | SS | 8000 | 43.00 | 15.07 | 12.1 |
| Cement | CMT | 2000 | 0.29 | 3.10 | 10.8 |
| Sand | SND | 2500 | 0.25 | 1.99 | 1.1 |
| Graphite | G | 2000 | 200.00 | 1.42 | 4.0 |
| Manganese oxide | MnO | 4600 | 4.10 | 7.70 | 39.1 |
| Aluminum Oxide | AlO | 2400 | 30.00 | 3.17 | 8.1 |
| Barium Sulfate | Brt | 4230 | 1.67 | 1.95 | 20.5 |
| Hematite | Hem | 5200 | 12.55 | 7.50 | 12.2 |
| Silicon Carbide | SiC | 3200 | 120.00 | 2.01 | 2.8 |
| Aluminum Nitride | AlN | 3260 | 165.00 | 2.46 | 19.1 |
| Air | AIR | 1.225 | 0.02 | 1.00 | 3400.0 |
| Water | H2O | 1000 | 0.60 | 4.19 | 21.4 |

The combination of different solid particulate materials, varying the particle size distribution thereof, and proportioning the solids and epoxy materials to emphasize composite thermal property effects can result in a sealant with satisfactory thermal properties, density, viscosity, slurry stability, handling time, mechanical properties, and seal effectiveness for low temperature petroleum well applications.

Formulation of an epoxy-solids composite to produce a durable well seal for low-temperature, large-volume applications involves first assessing the sealant application conditions and well geometry, and also determining the epoxy-solids composite slurry properties required for placement at the sealing location in the well (rheology, density, handling time, set time). Then, the kinetics of epoxy curing is evaluated to assess the extent of the thermal gradient the sealant will experience between the center and the outer surface thereof. Finally, six thermomechanical performance parameters of the epoxy-solids composite are optimized within the constraints of well conditions, sealant design, and sealant placement requirements. These performance parameters are:

Bond development factor
Thermal expansion factor
Exothermic factor
Heat flow factor
Heat duration factor
Set time/cool down factor A sealant performance correlation based on the six factors listed above relates the timing of heat generated by the resin-hardener reaction and dissipated from the sealant into the adjacent formation to the likelihood of the sealant bonding to the outer steel wall of the casing where the epoxy-solids composite sealing plug is to be placed. This correlation provides a realistic metric of a particular sealant formulation's chance of success in forming a well barrier, i.e., to effectively seal the well (Bond Correlation).

Each of these performance parameters and correlations are described below.

1. Bond Development Factor

The time at which bond strength is first noted in a volume of fluid, and setting, epoxy is critical to seal effectiveness. Ideally, internal bonding in the epoxy will not develop until after the temperature increase driven by the exothermic resin-hardener reaction has been reduced. Therefore, early bond strength development occurring after dissipation of the heat of reaction into the well bore ambient will result in less stress on the epoxy-casing bond and a greater chance of maintaining a seal in the well. Quantifying this value for epoxy-solid composites is critical to sealant design and the success of the sealant application.

An easy way to measure the setting profile of an epoxy is by using a penetration test. Below in Table 2 is the description of the penetration test criteria that we have developed, which is based on pressing a ⅛ inch diameter plastic rod against a volume of sealant, and the result of that pressing, i.e., whether the rod penetrates into the volume of sealant, and related properties.

TABLE 2

Penetration Test for Resin with ⅛" plastic rod

| Value | Physical condition of the epoxy-solid composite |
|---|---|
| P1 | A Viscous fluid |
| P2 | A Highly Gelled Semi-Solid |
| P3 | A Stiff Semi-Solid, which is Easily Penetrated but epoxy adheres to the rod |
| P4 | An Elastic Solid, Easily Deformed/Penetrated by the rod, but the epoxy does not adhere to Rod |
| P5 | An Elastic Solid, where the Rod is Able to deform the top of the epoxy, but the rod does not penetrate the resin |
| P6 | A Hard Solid, and the Rod is Unable to deform the top of the Epoxy |

Table 3, below, illustrates the significance of the bond development factor. The shear bond was measured on several epoxy samples as they were setting, using the shear bond test detailed later herein, and the results correlated to the penetration tests as is shown in table 3. When a shear bond has formed, the epoxy has adhered to the surrounding enclosure, for example the wall of a test vessel or the casing. The shear bond value verses the penetration test value indicated that the shear bonds begin to develop when the penetration test value is a "P4". This is significant, as the expansion and contraction of the resin due to temperature changes must be complete or nearly complete prior to a shear bond forming in the epoxy to minimize the detrimental effects of temperature change on the sealing properties of the epoxy-solid composite. Thus, a bond development factor of P4-to P6, occurring after the maximum temperature of the setting epoxy-solids composite has been reached, is preferred. The correlation of the forming of the shear bond based on the shear bond test with the P value of the penetration test allows for the use of the penetration test during testing of epoxy-solids composites as a substitute for the shear bond test.

TABLE 3

Shear Bond Development for Various Penetration Test Values

| Test | Shear Bond (psi) - Penetration Reading P3 | Shear Bond (psi) - Penetration Reading P4 | Shear Bond (psi) - Penetration Reading of P5 |
|---|---|---|---|
| 1 | 0 | 24.0 | 187 |
| 2 | 0 | 10.0 | 53 |
| 3 | 0 | 16.0 | 93 |
| 4 | 0 | 8.5 | 219 |
| 5 | 0 | 7.0 | 35 |

2. Thermal Expansion Factor

Methods for formulating epoxy-solid composites for well sealing applications must account for the difference between the CTE of the epoxy-solid composite compared to that of steel, the material with which epoxy must bond in most well sealing applications. The addition of materials to reduce the CTE of an epoxy-solids composite to that of steel, or to approach it, increases the potential for maintaining sealing contact between the epoxy-solid composite and the steel of a well casing as the sealing composite and the steel cool down after the maximum temperature caused by the resin-hardener reaction has been reached. Particulate solid materials with low CTE are blended with the epoxy, preferably with the resin before the hardener is intermixed therewith, so that the resulting CTE of the composite material is less than that of the epoxy itself. The particulates not only dilute the resin volume of the epoxy-solid composite per unit volume by reducing the volume of reactive components per cubic foot or cubic meter of sealant, they also lower the CTE of the resulting composite sealant material compared to that of the epoxy component thereof.

Table 4 below details the CTE of epoxy composites with various loadings of solids by total design volume (solids volume fraction, or SVF). The composite CTE can be approximated by the following equation:

$$CTE_c = CTE_r * VF_r + CTE_{p1} * VF_{p1} + CTE_{p2} * VF_{p2}$$

Where:

$CTE_c$ is the composite Coefficient of Thermal Expansion $CTE_r$ is the Coefficient of Thermal Expansion for the resin $CTE_{p1}$ is the Coefficient of Thermal Expansion for particulate type 1

$CTE_{p2}$ is the Coefficient of Thermal Expansion for particulate type 2

$VF_r$ is the volume fraction of the resin $VF_{p1}$ is the volume fraction of the particulate type 1

$VF_{p2}$ is the volume fraction of the particulate type 2

TABLE 4

Summary of Composite Epoxy Resin CTE for various SVF % of Solids

| | $CTE_c$ (μ in/in °K) | | |
|---|---|---|---|
| Solid Type | 20% SVF | 30% SVF | 40% SVF |
| EP (No Solids) | 54.0 | 54.0 | 54.0 |
| MnO | 51.0 | 49.5 | 48.0 |
| Brt | 47.3 | 44.0 | 40.6 |
| SiC | 43.8 | 38.6 | 33.5 |
| G | 44.0 | 39.0 | 34.0 |

Minimizing the Thermal Expansion Factor (TEF), calculated as the difference between the CTE of the resin composite and the CTE of steel, multiplied by the maximum temperature observed in specific geometries divided by 250° F. $[(CTE_c - CTE_s) * T_{max}]/250°$ F.], reduces the stresses induced in the matrix of the resin and on the bond formed between the resin and steel during cooling of the epoxy-solid composite from the elevated temperature caused by the exothermic resin-hardener reaction to the well ambient temperature. Presented in Table 6, below, are the maximum temperature ($T_{max}$) results for a variety of epoxy-solids composite sealant designs cured in specific geometry vessels. Using each designs' corresponding SVF %, the difference in CTE of the epoxy-solid composite and the CTE of steel was calculated and then used to compute the Thermal Expansion Factor, TEF. The TEF is preferably less than 45, and more preferably less than 30, for good control of the timing of shear bond formation with respect to the sealant temperature and the resulting seal integrity. See Table 9 for well geometry details.

TABLE 5

Thermal Expansion Factor Data

| System | SVF % | Solid Type | $CTE_c - CTE_S$ (μ in/in K) | Well Geometry | Maximum Temperature (Tmax, ° F.) | TEF |
|---|---|---|---|---|---|---|
| 1 | 18 | MnO | 39 | 3 | 258 | 40.2 |
| 2 | 18 | MnO/G | 38 | 3 | 136 | 20.7 |
| 3 | 18 | MnO/G | 38 | 3 | 142 | 21.6 |
| 4 | 18 | MnO | 39 | 3 | 158 | 24.6 |
| 5 | 18 | MnO | 39 | 3 | 189 | 29.5 |
| 6 | 18 | MnO/G | 36 | 3 | 203 | 29.2 |
| 7 | 18 | MnO | 39 | 4 | 244 | 38.1 |
| 8 | 18 | MnO/G | 36 | 4 | 287 | 41.3 |
| 9 | 18 | MnO/G | 36 | 4 | 162 | 23.3 |
| 10 | 18 | MnO/G | 36 | 4 | 284 | 40.9 |
| 11 | 18 | MnO/G | 36 | 4 | 236 | 34.0 |
| 12 | 32 | MnO/G | 33 | 1 | 85 | 11.2 |
|    | 32 | MnO/G | 33 | 3 | 229 | 30.2 |
| 13 | 20 | MnO | 39 | 1 | 85 | 13.3 |
|    | 20 | MnO | 39 | 2 | 115 | 17.9 |
|    | 20 | MnO | 39 | 3 | 220 | 35.2 |
| 14 | 15 | MnO | 40 | 1 | 100 | 16.0 |
|    | 15 | MnO | 40 | 2 | 135 | 23.5 |
| 15 | — | EP | 42 | 4 | 400 | 67.2 |

3. Exothermic Factor

The results of the mixing and setting of several examples of epoxy-solids compositions, which resulted in mitigating the exothermic reaction effects on the sealants, are shown in Table 6. The solid particulate(s) added to the base epoxy sealant fluid mixture were selected based upon their complimentary thermal properties with respect to the sealant, i.e., where the thermal property of interest in the sealant itself is high, one or more solid particulates having a low value of that same thermal property were added, and where the thermal property of interest in the sealant itself is low, one or more solid particulates having a high value of that same thermal property were added. The base epoxy formulation for these tests was 100 parts epoxy resin, 30 parts reactive diluent, 30 parts high temperature hardener, 10 parts silane, and 3 parts hardener reaction accelerator, all by weight. An example of a Portland cement sealant, system 6, with no additives, was also tested. The base Portland cement composition was API Class H cement mixed with 4.3 gal/sk (gallons per 94 lb sack) water. All of the sealants were designed to be stable fluids that set at 70° F. in an appropriate time frame, i.e., the designed-in time before the sealant sets was as long as, or longer than, the time needed to thoroughly mix the formulation and pump it to the sealing location in the well. Additionally, the sealants were designed to be mixable in fluid form, and pumpable to the well sealing location, or to the open casing at or slightly above the seafloor, with standard oilfield equipment. Testing consisted of mixing 4 gallons of each sealant and pouring it into a 5-gallon metal bucket (about 2 feet high having a diameter of 12") with a thermocouple extending through the bucket wall at the fluid's height midpoint in the bucket and extending 2 inches into the bucket from the inner wall thereof. The buckets having the sealant composition mixtures therein were held at room temperature (70° F.) while the sealant compositions set. The temperature of the sealant compositions were monitored throughout the setting time period. The maximum temperature and the time of occurrence thereof are reported in Table 6.

The results of these tests demonstrate that increased volumes of solid particulates resulting in the same volume of a sealant-solid composition (here 4 gallons) substantially reduced the maximum reaction temperature reached by the sealant-solid compositions as compared to a same volume of base sealant without these solid additives. The most dramatic temperature reduction resulted from the addition of a combination of graphite and manganese oxide (system 4).

It is important to note that there is a limit to the amount of solids that can be added to an epoxy volume due to excess viscosity of the resulting epoxy-solids composite. The limit of mixing these solids in the different sealant systems is also provided in table 6.

TABLE 6

Change in Temperature vs. Time of Epoxy Compositions in metal bucket in Air ambient

| System | SVF % | Solids Type | Max Temp ($T_{max}$, ° F.) | Time to $T_{max}$ ($t_{max}$, hr:min) | Max Solids Mixable, SVF % |
|---|---|---|---|---|---|
| 16 | 0 | None | 237 | 18:06 | NA |
| 17 | 15 | MnO | 249 | 9:34 | 18 |
| 18 | 38 | 80% Silica/20% MnO | 150 | 14:57 | 35 |
| 19 | 30 | 90% G/10% MnO | 101 | 1:37 | 21 |
| 20 | 18 | CMT/-20 lb/sk G | 134 | 5:31 | 25 |
| 21 | 0 | CMT | 142 | 8:20 | NA |

Table 7 provides the results of twenty adiabatic temperature rise tests performed at room temperature using a standard base epoxy formulation loaded with varying volumes of distinct solid materials. Each sealant design was mixed and placed in an insulated vacuum bottle, which creates close to adiabatic conditions. The resulting temperature increase resulting from the exothermic setting reaction with respect to time was recorded. The table specifies the type of solid material added, the percent by volume of the solid to the total volume of the epoxy-solid composite mix, the maximum adiabatic temperature ($T_{a,max}$) achieved during the test and finally an Exothermic Factor (ETF). This factor is the ratio of the maximum adiabatic temperature observed in the test divided by 250° F. [($T_{a,max}$)/250° F.]. The ETF value should be less than 1.1 and preferably under 0.8. The values for Portland cement are included for comparison purposes.

TABLE 7

Adiabatic Temperature of Composite Resins with various Solid Material additions

| Solids Type | SVF % | MaxTemp ($T_{a, max}$, ° F.) | ETF |
|---|---|---|---|
| MnO (14) | 15 | 250 | 1.00 |
| MnO (13) | 20 | 240 | 0.96 |
| MnO | 25 | 230 | 0.92 |
| MnO | 30 | 220 | 0.88 |
| MnO | 35 | 200 | 0.80 |
| AlO | 20 | 242 | 0.92 |
| AlO | 25 | 238 | 0.95 |
| AlO | 30 | 210 | 0.84 |
| AlO | 35 | 190 | 0.76 |
| SiC | 20 | 250 | 1.0 |
| SiC | 25 | 245 | 0.98 |
| SiC | 30 | 225 | 0.90 |
| SiC | 35 | 220 | 0.88 |
| SiC | 40 | 190 | 0.76 |
| SiC | 50 | 162 | 0.65 |
| G | 20 | 290 | 1.16 |
| G | 25 | 270 | 1.08 |
| G | 30 | 252 | 1.00 |

TABLE 7-continued

Adiabatic Temperature of Composite Resins
with various Solid Material additions

| Solids Type | SVF % | MaxTemp ($T_{a,\ max}$, ° F.) | ETF |
|---|---|---|---|
| G | 35 | 248 | 1.00 |
| G | 40 | 222 | 0.89 |
| G | 50 | 172 | 0.69 |
| MnO/G (12)* | 32 | 235 | 0.94 |
| SND | 20 | 260 | 1.04 |
| Brt | 28 | 250 | 1.00 |
| CMT | 28 | 238 | 0.95 |

*Weighted average calculated using the maximum temperature for each weighting material times the % volume proportion of material in composite In the following Table 8, details of various solids-free epoxy formulas and their corresponding maximum adiabatic temperature are shown. The data confirms the maximum temperature of the epoxy reached as a result of the exothermic reaction can be controlled by varying the diluent and hardener concentrations with respect to the overall volume of the epoxy formulation. Additionally, the Exothermic Factor has been calculated. Changing the diluent volume loading changed the maximum adiabatic temperature and ETF significantly. The ETF can be changed from 1.4 down to 1.0 with just the addition of diluent. Also, the combined loading modification of hardeners along with diluents can alter the maximum temperature and ETF value (see test 23, 25 and 26). The diluents are fluids that react with hardeners like resin but have a low viscosity. These diluents are used to decrease the viscosity of the composite fluid.

TABLE 8

Adiabatic Temperature of Resins with various
Diluent and Hardener additions

| System | Vol % Diluent | Vol % Low Temperature Hardener (LTH) | Maximum Temperature ($T_{a,\ max}$, ° F.) | ETF |
|---|---|---|---|---|
| 15 | 15 | 32.5 | 343 | 1.4 |
| 22 | 20 | 35 | 345 | 1.4 |
| 23 | 30 | 35 | 310 | 1.2 |
| 24 | 40 | 35 | 265 | 1.1 |
| 25 | 45 | 35 | 245 | 1.0 |
| 26 | 40 | 40 | 320 | 1.3 |
| 27 | 40 | 50 | 350 | 1.4 |
| 28 | 50 | 40 | 260 | 1.0 |

4. Heat Flow Factor

Quantifying the thermal conductivity, heat capacity, and the extent of the exothermic resin-hardener reaction and associated heat generated in view of the well geometry and sealant mass is necessary to a ensure reasonable curing time of the epoxy-solids composite, balanced with adequate bond strength of the epoxy-solids composite. Comparing the exothermic factor ($T_{a,max}/250°$ F. under adiabatic conditions) and the heat flow factor ($D_e^{1/3}/K$) reveals the thermal energy the sealant will generate in comparison to the sealant's ability to conduct the thermal energy to its surroundings. Minimizing each factor individually will improve the sealant's effectiveness in the application. A lower change in the temperature (ΔT) indicates increased heat capacity and dilution of the composite while formulations having lower heat flow factors have a lower temperature gradient between the center of mass to the outer boundary of the volume of epoxy-solid composite resulting in reduced temperatures at the outer boundary of the volume of epoxy-solid composite because of the lower ambient temperature at the wall. Note in Table 9 the increase in HFF corresponding to the reduction of thermal conductivity (k) of the composite resin and/or the increase of effective diameter of the sealant volume as a result of different test vessel geometries. The desired range for HFF is <5.5.

Table 9 herein sets forth additional well geometry details.

Various diameters of casing and piping are disclosed herein, and used in the tests for some of the six performance factors hereof. Table 9 provides the actual inner diameters of four different typical well configurations.

TABLE 9

Effective Diameter of various Geometries of well piping or casing

| Well Geometry/ Configurations | Pipe/Annulus | D effective (in) |
|---|---|---|
| 1 | 2" Schedule 40 Black Pipe | 2.067 |
| 2 | 9⅝", 47# × 4½", 15.1# | 4.181 |
| 3 | 13⅜", 72# | 12.347 |
| 4 | 18⅜", 87# | 17.755 |

TABLE 10

Heat Flow Factor of Resin Systems with various
Thermal K values and Geometries

| System | Solid Type | SVF (%) | Thermal Conductivity (W/m°k) | Heat Flow Factor | | | |
|---|---|---|---|---|---|---|---|
| | | | | $D_e =$ 2.07" | $D_e =$ 4.18" | $D_e =$ 12.35" | $D_e =$ 17.76" |
| 1 | G | 46 | 2.62 | 0.5 | 0.6 | 0.9 | 1.0 |
| 29 | SiC | 34 | 1.51 | 0.8 | 1.1 | 1.5 | 1.7 |
| 30 | G | 29 | 1.31 | 1.0 | 1.2 | 1.8 | 2.0 |
| 31 | G | 23 | 1.01 | 1.3 | 1.6 | 2.3 | 2.6 |
| 32 | MnO/G/SND | 33 | 0.96 | 1.3 | 1.7 | 2.4 | 2.7 |
| 12 | MnO/G | 32 | 0.58 | 2.2 | 2.8 | 4.0 | 4.5 |
| 13 | MnO | 20 | 0.40 | 3.2 | 4.0 | 5.8 | 6.5 |
| 14 | Manganese Tetra Oxide | 15 | 0.30 | 4.3 | 5.4 | 7.7 | 8.7 |
| 15 | EP | — | 0.27 | 4.7 | 6.0 | 8.6 | 9.7 |
| 33 | EP | — | 0.23 | 5.4 | 6.9 | 9.9 | 11.1 |

5. Heat Duration Factor

An additional benefit of increased thermal conductivity specific to epoxy sealants is a more linear thermal gradient from the epoxy center of mass to the outer surface or boundary of the volume of epoxy. Without thermal property modifying particulate solids, epoxy is insulating, and the heat generated by the resin-hardener reaction is retained throughout most of the volume thereof during the resin-hardener reaction and for a long time period thereafter. The temperature near the boundary of the volume of epoxy drops off to that of, or close to that of, the surrounding material. With this temperature distribution, most of the epoxy volume expands and then hardens. The very small volume of epoxy around the perimeter of the hardened part remains fluid because the reaction of the resin and hardener is temperature dependent, and this portion of the epoxy is cooler, and thus less reactive than, the remainder thereof. As this small volume of fluid around the perimeter sets and cools, it can contract away from the casing surrounding the sealant leaving a gap that disrupts the desired seal. A more linear temperature distribution within a large volume of resin containing solid particulate material with appropriately-designed thermal properties allows more gradual hardening from the center of the volume of epoxy and then outwardly therefrom. Thus, larger volumes of the epoxy resin remain in the fluid state as the material sets and cools. This permits bond formation to the perimeter to incorporate a larger fluid volume with more evenly distributed stresses upon cooling. The gaps resulting from the thin epoxy films' contraction are eliminated. Additionally, any fluid pressure exerted on the epoxy mass from above is freely transmitted through the epoxy to the well below as the epoxy sets in a more uniform progression. This pressure maintenance minimizes well fluid migration through the setting epoxy thereby improving seal formation. The table below shows a summary of data that was collected on different seal geometries with different epoxy-solids composite compositions with different solids in the epoxy-solid composite. The table shows the test performed including the diameters of the seal, and the epoxy composition including the resin, diluent, hardener and solids by % by volume. The type of solids used is also provided. All systems were cured in five gallon buckets, as described above, in air unless otherwise noted. In the tests, the maximum temperature that was achieved in the test in the middle of the sample is provided. Additionally, the time from the start of the test until the maximum temperature is reached in the middle of the sample is also presented. The Heat Duration Factor is calculated (HDF). This value is the Maximum Temperature reached after mixing and allowed to set static as a mass, divided by the time to reach the maximum temperature. This HDF factor is the rate at which the composite resin system heated up. The lower this value, e.g., the slower this the epoxy-solids composite reaches its maximum temperature, the better, as the maximum temperature is thus more likely to be reached before significant hardening of the fluid epoxy-solids composite has occurred. Herein, where the HDF is 55 or less, the epoxy-solids composite is likely to reach maximum temperature while still in a fluid state, i.e., having a bond development factor of P3 or less.

The heat duration factor is useful in the design of a successful seal application which includes formulating, i.e., designing, an epoxy-solids composite with a low thermal gradient between its center of mass and the outer peripheral surface thereof. Minimizing the heat duration factor (isothermal $T_{max}/t_{max}$) for the exothermic reaction reduces the temperature gradient to which the curing epoxy will be subjected. The rate of temperature increase in epoxies cured in isothermal conditions is a function of reaction kinetics, composite heat capacity, and composite thermal conductivity. Controlling hardener type and concentration thereof as well as the addition of particulate solids to raise the specific heat and thermal conductivity can be combined to reduce the heat duration factor.

TABLE 11

Heat Duration Factor Data

| System | Vessel | Diluent (% bwor) | Hardener (% bwor) | SVF % | Solid Type and relative % of solids by volume | Max Temp ($T_{max}$, ° F.) | Time to $T_{max}$ ($t_{max}$, hr:mn) | HDF |
|---|---|---|---|---|---|---|---|---|
| 1 | 3 | 10 | 30 | 18.4 | MnO | 258 | 3:35 | 72 |
| 2 | 3 | 20 | 25 | 18.4 | 75/25 MnO/G | 136 | 5:36 | 24 |
| 3 | 3 | 25 | 25 | 18.4 | 75/25 MnO/G | 142 | 4:31 | 31 |
| 4 | 3 | 25 | 25 | 18.4 | MnO | 158 | 4:19 | 37 |
| 5 | 3 | 20 | 27.5 | 18.4 | MnO | 189 | 5:22 | 35 |
| 6 | 3 | 20 | 32.5 | 18.4 | 50/50 MnO/G | 203 | 4:56 | 41 |
| 7 | 4 | 20 | 30 | 18.4 | MnO | 244 | 6:12 | 39 |
| 8 | 4 | 20 | 35 | 18.4 | 50/50 MnO/G | 287 | 5:25 | 53 |
| 9 | 4 | 20 | 20 | 18.4 | 50/50 MnO/G | 162 | 9:46 | 17 |
| 10 | 4 | 30 | 40 | 18.4 | 50/50 MnO/G | 284 | 4:10 | 68 |
| 11* | 4 | 25 | 25 | 18.4 | 50/50 MnO/G | 236 | 6:04 | 39 |
| 12 | 1 | 20 | 35 | 32.0 | 50/50 MnO/G | 85 | 6:00 | 14 |
|  | 3 | 20 | 35 | 32.0 | 50/50 MnO/G | 229 | 4:15 | 54 |
| 13 | 1 | 20 | 30 | 32.0 | MnO | 84 | 8:00 | 11 |
|  | 2 | 20 | 30 | 20.4 | MnO | 121 | 5:03 | 24 |
|  | 3 | 20 | 30 | 20.4 | MnO | 220 | 4:32 | 49 |
| 14 | 1 | 10 | 30 | 14.5 | MnO | 100 | 3:45 | 27 |
|  | 2 | 10 | 30 | 14.5 | MnO | 145 | 4:00 | 36 |
| 15 | 1 | 15 | 32.5 | — | — | 114 | 3:54 | 29 |
|  | 4 | 15 | 32.5 | — | — | 400 | 11:48 | 34 |

*Pail was surrounded by sand while curing.

6. Set Time, Cool Down Factor

The time at which the epoxy mechanically bonds to the internal wall of the casing, compared to dissipation of the heat generated from the epoxy-solid composite in the exothermic setting reaction is herein the set time factor. The time when the bond is initially formed compared to the time to which the epoxy seal reaches temperature equilibrium with the adjacent ambient after the exothermic resin-hardener reaction is completed, provides a good indicator of heat transfer, reaction kinetics and stresses imposed during bond formation. Table 12 provides tabulated results of this set time cool down factor (STF). The epoxy system, i.e., the epoxy-solids composite, is provided for reference as is necessary data to calculate the STF. The time that the epoxy-solids composite took to cool down from the maximum temperature to 100 F and 80 F is provided along with the time for the epoxy-solids composite to reach a penetration test value of P4 and P5 adjacent to the wall of the metal test vessel. The corresponding value of STF is calculated for all of the epoxy-solids composites. The STF is calculated as follows: The total time from initial mixing and placed in static mass to the composite reaching of ambient temperature in F plus 20 F divided by the time to reach P4 in hours ($t_{am+20F}/t_{p4}$). This ratio is provided in the STF column. To provide a satisfactory seal, this value needs to be <1.0.

TABLE 12

Set Time, Cool Down Factor

| System | Vessel | Solid Type (% of solids) | HDF | Time to <20° F. of Ambient ($t_{am+20°F}$, hr:min) | Time to Ambient ($t_{am}$, hr:min) | Time to P4 ($t_{p4}$, hrs) | Time to P5 ($t_{p5}$, hrs) | STF |
|---|---|---|---|---|---|---|---|---|
| 1 | 3 | MnO | 72 | 17:04 | 22:52 | 5 | 6 | 4.3 |
| 2 | 3 | 75/25 MnO/G | 24 | 13:42 | 21:35 | 108 | >168 | 0.3 |
| 3 | 3 | 75/25 MnO/G | 31 | 13:45 | 21:13 | 131 | >168 | 0.3 |
| 4 | 3 | MnO | 37 | 14:31 | 22:15 | 132 | >168 | 0.5 |
| 5 | 3 | MnO | 35 | 17:41 | 26:32 | 48 | 74 | 0.4 |
| 6 | 3 | 50/50 MnO/G | 41 | 14:30 | 21:35 | 24 | 74 | 0.5 |
| 7 | 4 | MnO | 39 | 32:46 | 43:00 | 18 | 85 | 0.7 |
| 8 | 4 | 50/50 MnO/G | 53 | 25:50 | 33:55 | 18 | 64 | 0.5 |
| 9 | 4 | 50/50 MnO/G | 17 | 26:31 | 37:47 | 129 | >139 | 0.9 |
| 10 | 4 | 50/50 MnO/G | 68 | 23:42 | 32:07 | 17 | 45.5 | 0.6 |
| 11 | 4 | 50/50 MnO/G | 39 | 31:47 | 43:15 | 17 | 54.5 | 0.7 |
| 12 | 1 | 50/50 MnO/G | 14 | 8:33 | 9:17 | 22.5 | 78 | 0.1 |
|  | 3 | 50/50 MnO/G | 54 | 13:47 | 19:47 | 18.5 | 74 | 0.3 |
| 13 | 1 | MnO | 11 | 6:43 | 7:22 | 27 | 79 | 0.1 |
|  | 2 | MnO | 24 | 8:35 | 13:05 | 20 | 70 | 0.4 |
|  | 3 | MnO | 49 | 17:41 | 24:32 | 8 | 12 | 0.4 |
| 14 | 1 | MnO | 27 | 9:46 | 12:17 | 23 | 72 | 0.4 |
|  | 2 | MnO | 36 | 11:55 | 13:05 | 40.5 | 112.5 | 0.3 |
| 15 | 1 | — | 29 | 7:54 | 14:41 | 19 | 63 | 0.4 |
|  | 4 | — | 34 | 61:24 | 72:07 | 15.5 | 45 | 4.0 |

As set forth below, in summary, provided herein are 6 epoxy-solids composite performance criteria, that when satisfied will accurately estimate the in-situ thermal properties and reaction kinetics behavior of the epoxy-solids composite to produce a durable well seal comprised of an engineered composite epoxy-solids sealant. The composite is engineered from a resin based epoxy with the addition of solid particulate materials that improve thermal properties. The 6 performance criteria provided herein, and the acceptable and preferred values for each criteria, are set forth in Table 13 below.

TABLE 13

Acceptance Range for each Performance Criteria

| Description | Formula | Abbreviation | Max Range | Narrow Range | Preferred Range |
|---|---|---|---|---|---|
| Bond Development Factor | All Factors < or = to Max Range Value | BDC | Good resin composite design achieved when all performance factors within acceptable values. | | |
| Thermal Expansion Factor | $(CTE_R-CTE_S)*T_{max}/250°$ F. | TEF | <45 | <35 | <25 |
| Exothermic Factor | $T_{a, max}/250°$ F. | EXF | <1.1 | <0.9 | <0.8 |
| Heat Flow Factor | $D_e^{1/3}/K$ | HFF | <5.5 | <4.5 | <3.0 |
| Heat Duration Factor | $T_{max}/t_{max}$ | HDF | <55 | <40 | <35 |
| Set time/ Cool down factor | $t_{am+20\,F.}/t_{p4}$ | STF | <1.0 | <0.85 | <0.8 |

When all 6 performance criteria are satisfied, the design of a resin sealant with appropriate thermal properties, reaction kinetics, and strength development profile has been achieved. Good bond to surrounding metal was confirmed by observation of bonding within the epoxy seal and the boundary with the metal container and/or a physical shear or hydraulic bond test. The following table details the performance criteria results for each factor in tabular form. The bond correlation was accurate in predicting an effective seal.

TABLE 14

Summary of Factor Result Data

| Test | Well Config. | TEF | EXF | HFF | HDF | STF | Bond Ob | Bond Tested |
|---|---|---|---|---|---|---|---|---|
| 1 | 3 | Y | Y | Y | N | N | N | — |
| 7 | 4 | Y | Y | N | N | N | N | — |
| Base | 3 | N | Y | Y | N | Y | N | — |
| Base HD MM | 3 | Y | Y | N | Y | Y | N | — |
| 9 | 4 | Y | Y | Y | Y | Y | Y | — |
| MU | 4 | Y | Y | N | Y | N | N | — |
| 8 | 4 | Y | Y | N | N | N | N | — |
| HT Bar | 3 | N | Y | N | Y | N | N | — |
| HT MM | 3 | Y | Y | Y | Y | Y | Y | — |
| Mu SiC 20% | 2 | Y | Y | Y | Y | Y | Y | — |
| Mu Sic 20% | 2 | Y | Y | Y | Y | N | N | — |
| 2 | 3 | Y | Y | Y | Y | Y | Y | — |
| 3 | 3 | Y | Y | Y | Y | Y | Y | — |
| 4 | 3 | Y | Y | Y | Y | Y | Y | — |
| 5 | 3 | Y | Y | Y | Y | Y | Y | — |
| 6 | 3 | Y | Y | Y | Y | Y | Y | — |
| FW-18-13 | 4 | Y | Y | Y | Y | Y | Y | — |
| 12 | 1 | Y | Y | Y | Y | Y | Y | Y |
|  | 3 | Y | Y | Y | Y | Y | Y | Y |
| 13 | 1 | Y | Y | Y | Y | Y | Y | Y |
|  | 2 | Y | Y | Y | Y | Y | Y | Y |
|  | 3 | Y | Y | N | Y | Y | N | N |
| 14 | 1 | Y | Y | Y | Y | Y | Y | Y |
|  | 2 | Y | Y | N | Y | N | N | N |
| 15 | 4 | N | Y | N | Y | N | N | N |

Shear Bond Testing

Figure 5:
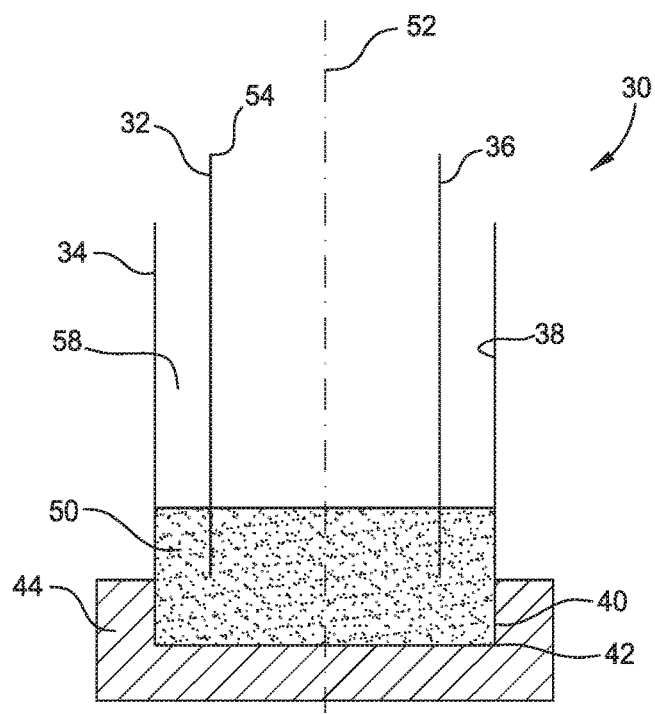
FIG. 5 is a sectional schematic view of a test fixture for testing shear bond strength of an epoxy sealant.

To determine the shear bond strength as set forth in Table 3 hereof, the inventors hereof developed a shear bond test and test fixture 30. As shown in section in FIG. 5, the test fixture 30 includes a non-threaded 6-inch long by 2-inch diameter schedule 40 black pipe 32 located within a threaded 6-inch long by 3-inch diameter schedule 40 black pipe 34. The outer surface 36 of 2-inch pipe 32, and the inner surface 38 of three inch pipe 34, are sandblasted, then washed with soap and water, and lastly rinsed with acetone.

After being rinsed with acetone, the threads 40 on one end 42 of the 6-inch long by 3-inch diameter schedule 40 black pipe are wrapped with Teflon tape and a high pressure cap 44 is threaded onto the taped end of the pipe. Afterwards, the fixture 30 is supported vertically with the open ends of the pipes 32, 34 facing upwardly. The bottom 2-inches of pipe 34 is filled with 100 mesh sand and then the pore space of the sand bed is filled with a calcium chloride brine. The brine saturated sand bed 50 prevents the test fluid, i. e., the epoxy or the epoxy-solids composite from filling the cap 44. At this point, the 6-inch long by 2-inch diameter pipe 32 is located within the 3-in diameter pipe 34 and forced 1-inch into the saturated sand bed 50. Note, the inner pipe 32 is centralized, i.e., the centerline 52 of both pipes 32, 34 are the same or very close to the same, and the upper end 54 thereof ensured to be level with the use of a ruler and level. At this point, the fixture 30 is ready to be filled with a sealant fluid to be shear tested.

The sealant fluid to be tested, in this case resin based epoxy formulations, are mixed with an IKA RW 20-digital tabletop mixer coupled with a 3 bladed propeller stirrer. The mixer is gradually ramped up to 600 rpm+/−50 rpm with the propeller located at ¾ of the base resin component of the epoxy sealant height in the mixer. The resin components are then added with each mixture stirred for 1 min before proceeding to the next component. Once all components including accelerator and hardener have been fully added, the mixture is allowed to continue mixing for a 30 min conditioning period. The epoxy (or epoxy-solids composite) is then ready to be poured into the shear bond test fixtures.

Figure 6:
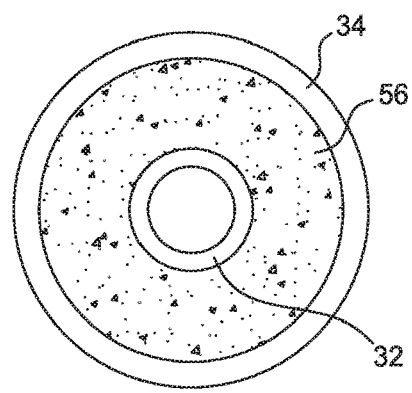
FIG. 6 is an end view of the test fixture of FIG. 5.

The epoxy 56 in fluid form is then poured into the annular space 58 between the pipes 32, 34, until the fluid level of the epoxy 56 is ½-inch (12 mm) from the top lip 60 of the 3-in diameter pipe. Once poured into the fixture, the epoxy 56 (including epoxy solids composites) is allowed to cure for a designated curing time period. After the designated curing time period has elapsed, the epoxy 56 is ready for shear bond testing. A cross-sectional view of a pipe-in-pipe configuration for shear bond testing is illustrated in FIG. 6.

Shear Bond Test Procedure

Once the epoxy has cured, the high pressure cap 44 and saturated sand bed 50 are removed. Then a caliper is used to measure the precise length 62 of the 3-in diameter pipe 34, the depth 64 from the bottom lip of the 3-inch diameter pipe to the bottom of the cured annular epoxy 56 sealing plug, and the depth 66 from the top lip of the 3-inch diameter pipe to the top of the annular epoxy 56 sealing plug. With these measurements, the effective annular plug length can be calculated. In addition, the precise dimensions of the outer pipes 34 inside diameter 68 and the inside pipes' 32 outer diameter 70 is recorded. This allows correlation of results from test to test for different areas of contact between the epoxy 56 and the pipes 32, 34. The test fixtures are then ready to be tested.

Figure 7:
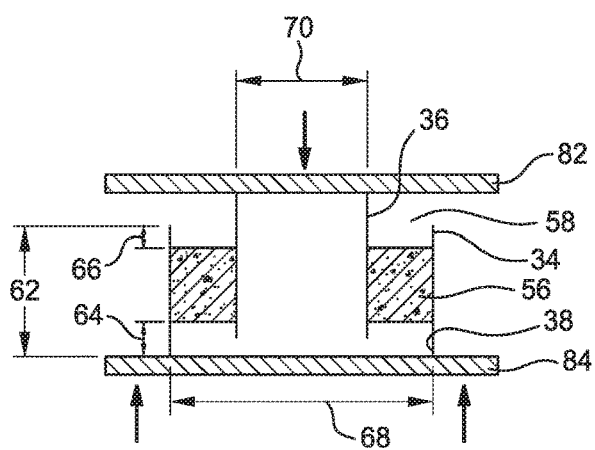
FIG. 7 is a sectional view of the test fixture of FIG. 5 having sealant therein in a load frame.

The fixture is then centered inside a load frame and a safety shield is closed and securely locked. As shown in FIG. 7, the top plate 82 of the load frame is lowered until it engages with the top 54 of the inner pipe 32 while the lower end of outer pipe 34 rests on the lower plate 84 of the load frame. Hydraulic pressure is then applied to the loaded fixture until bonding failure of the epoxy 56 to the inner wall 38 of outer pipe 34 or to the outer wall 36 of the inner pipe 32, or internal failure of the seal, is observed. Once failure is noted, the test stops and the pipe 32 or 34 is not pushed out of the annular epoxy 56 seal material.

At the conclusion of the test, the maximum load value is recorded and later used for calculating shear bond results. Theoretically, failure should occur in the inside pipe 32 to annular epoxy interface due to the lesser surface area between the inner pipe 32 and the annular epoxy versus that of the annular epoxy to outer pipe 34.

Shear Bond

The shear bond test measures the stress necessary to break the annular plug to inner pipe bond by applied force to the inner pipe while holding the outer pipe. The shear bond is calculated by dividing the shear bond force necessary to move the internal pipe with respect to the annular epoxy 56 sealant plug to inner pipe 32 interface, using Eq. 1.1 and 1.2.

$$\tau = P/A \tag{1.1}$$

and $$A = L * \pi D \tag{1.2}$$

where:
τ=shear bond of the material
P=shear bond force applied to move the inner pipe
A=area of the inner pipes outer surface traversed by the annular plug
L=effective length of the annular plug
D=outer diameter of the inner pipe
π=the mathematical constant Substituting equation 1.2 into equations 1.1, the shear bond is expressed in terms of length L and diameter D in equation 1.3.

$$\tau = \frac{P}{L * \pi D} \tag{1.3}$$

Application Example

As shown schematically in FIG. 1, an offshore well targeted for abandonment includes a plurality of telescoping casings 2 extending from the sea floor 1, or slightly thereabove, to the producing formation 09 inwardly of the earth. The distance between the seafloor and the producing formation(s) is on the order of thousands of feet, whereas the diameter of the casings is on the order of several feet to less than one foot. The series of telescoping casings 02 through 05 were previously cemented in place in the drilled well bore by cement extending between at least portions of the lengths thereof and the adjacent earth formations of the drilled bore, and cement is also located in at least a portion of the annulus where the smaller casing extends inwardly of an overlying larger casing. A production tubing 06 is isolated from the casings by a production packer 07. The casing extending through or into a producing formation includes perforations 08 therethrough to provide a hydrocarbon flow path from the producing formation 09 into the well bore.

Figure 2:
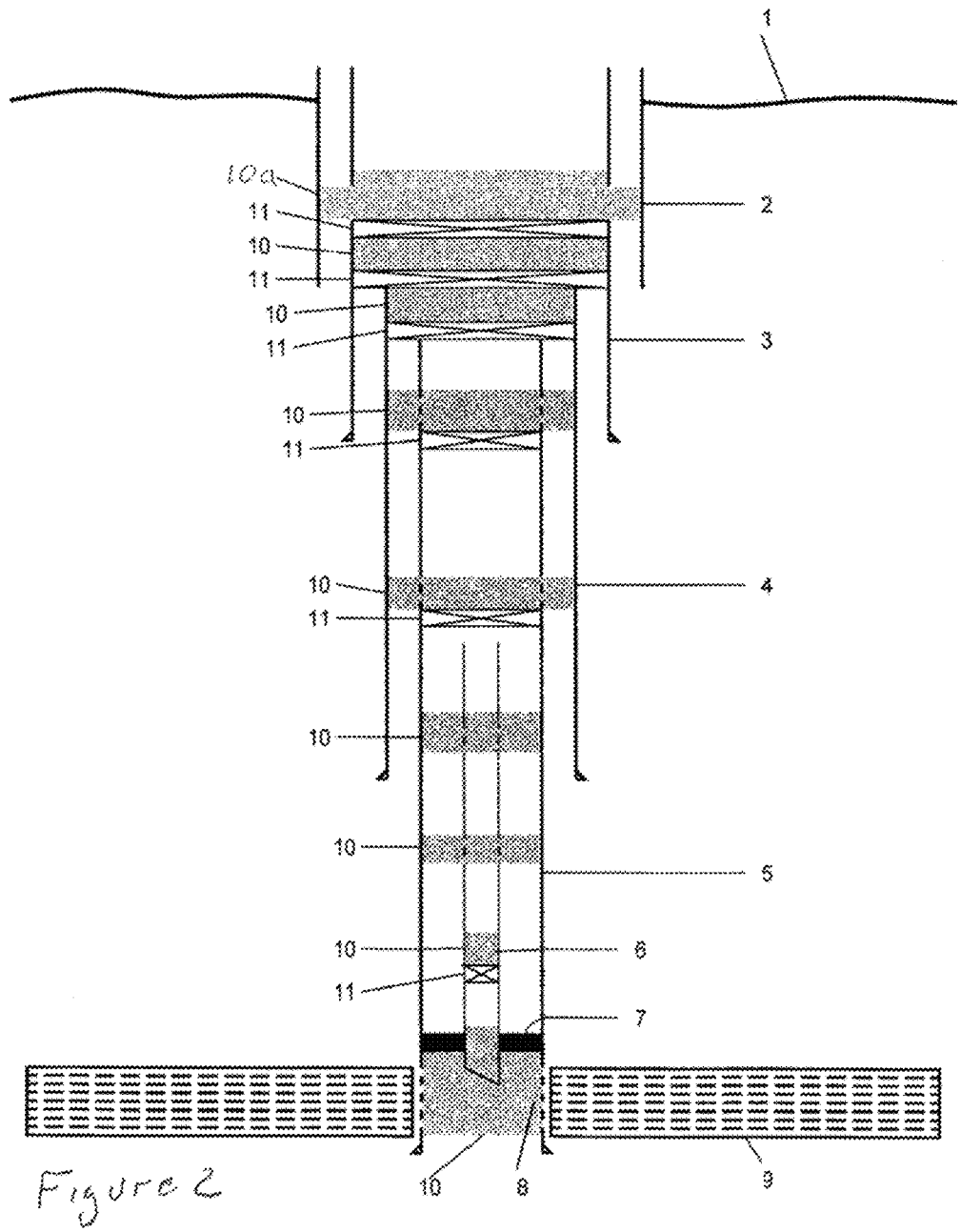
FIG. 2 is a schematic sectional view of the well of FIG. 1 with normal abandonment operations complete up to installation of the final plug at the top of the well.

FIG. 2 illustrates the same well with normal abandonment operations completed prior to installation of the final plug at the top of the well. At this point in the well abandonment operation, portions of the production tubing 06 and casings 05 and 04 have been cut at locations below the seafloor and removed. A series of mechanical plugs 11 and Portland cement sealant plugs 10 were then placed in casings 2, 3, 4, 5 and 7 and production tube 6. The uppermost plug 10a is subject to strict performance testing to ensure final seal integrity, and thus the overall sealing integrity of the well. For some wells, abandonment is complicated by well seal failures that result in reaching this critical final abandonment step without achieving a seal at the sealing locations deeper in the well and at the uppermost installed sealing location of plug 10a. In this situation, fluid from lower formations in the well will find a pathway up to through the uppermost plug 10a as evidenced by observation of hydrocarbon leakage through the uppermost plug 10a. The presence of a leak at this stage of abandonment is critical since governing agencies will not approve the abandonment if there is leakage at this point, and little room exists to attempt placing more plugs to stop repair the leak. Epoxy resin is often the sealant of choice for this final attempt to plug the well, because the length (height) of an epoxy resin plug having the same sealing properties as a Portland cement seal is significantly smaller than that of the equivalent Portland cement seal, and the shorter required sealing plug lengths using epoxy resin will more easily fit into the remaining depth of the well bore and casing 2, 3 adjacent to the top of the well. The diameter of the upper casing ranges from 18 inches to 30 inches, creating the need for a large resin volume to be placed into a cylindrical space with a low surface area to volume ratio. Since well temperatures at these well depths usually range from 65° F. to 80° F., the thermal properties of epoxy resin can result in excessive stress generation in the solid epoxy seal during and after setting and then cooling, and associated seal failure.

Figure 3:
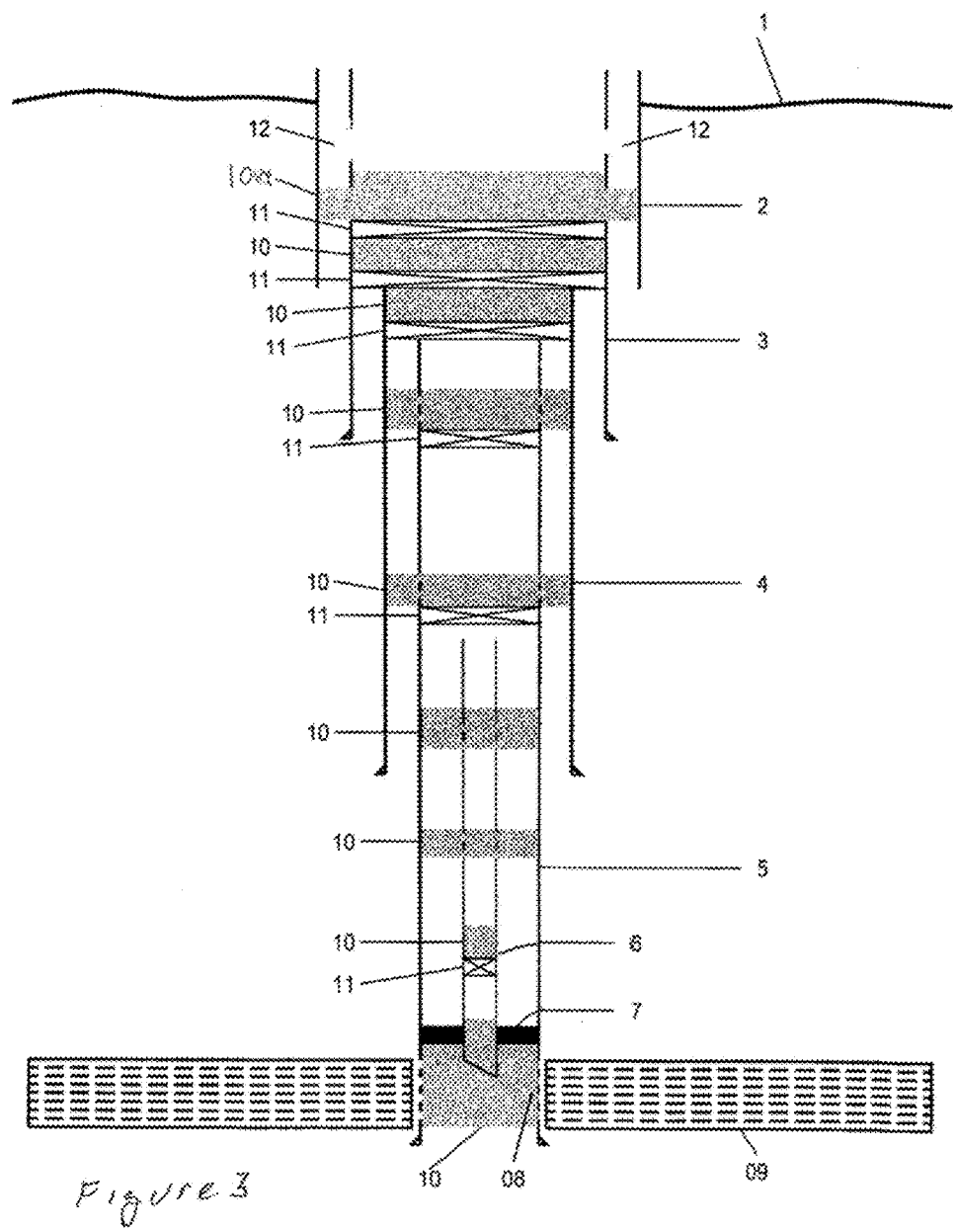
FIG. 3 is a schematic sectional view of the well of FIG. 2 prepared to set an epoxy resin plug above the plug that has leaked.

FIG. 3 illustrates the well prepared to set an epoxy plug therein above a uppermost plug 10a that has leaked. In this case, a window 12 is milled through the casing 3 and through any cement thereabout to the casing 2 inner wall to allow sealant to flow therein and block any flow paths that might also exist in the annulus between casings 2, 3.

Figure 4:
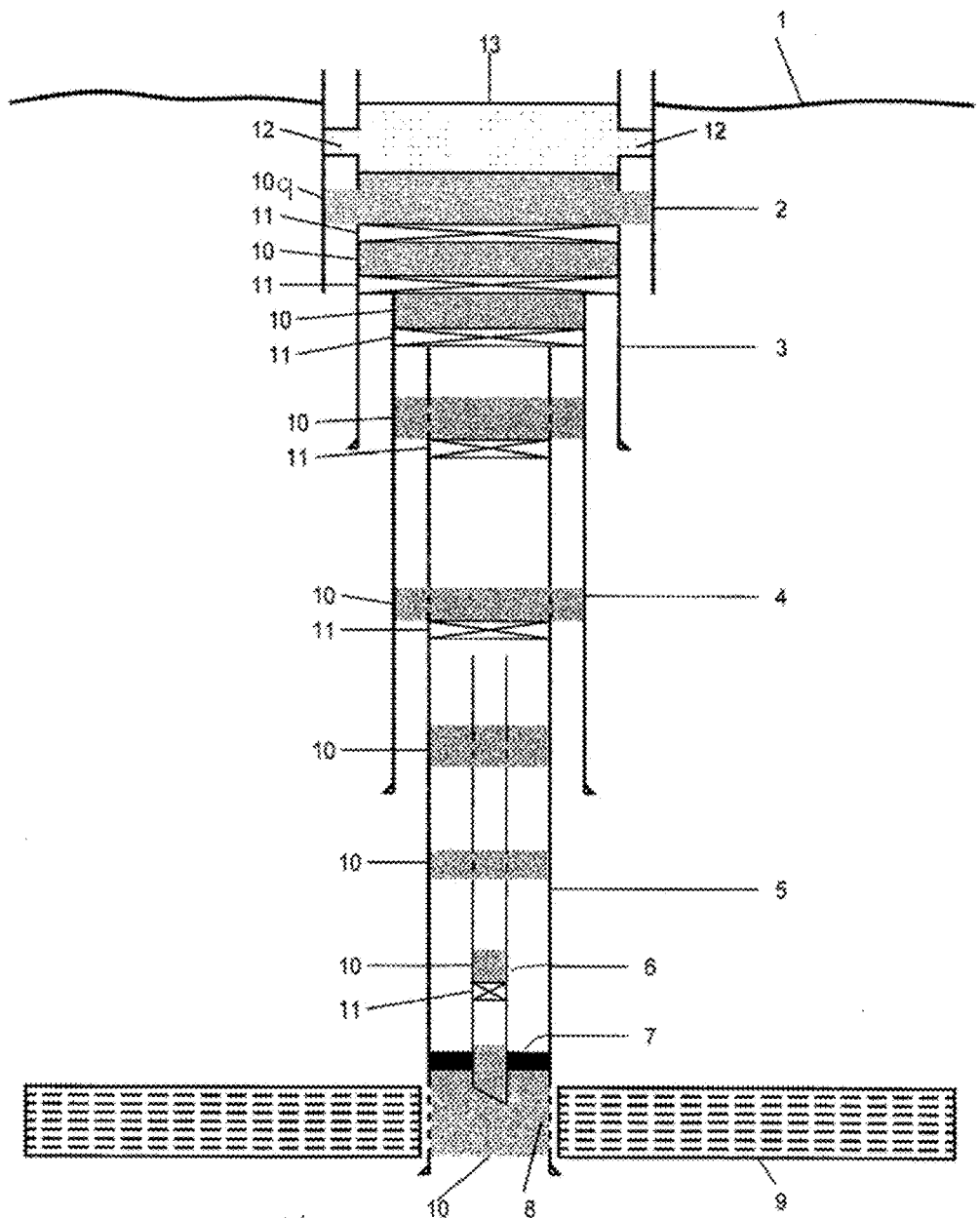
FIG. 4 is a schematic sectional view of the well of FIG. 3 with the epoxy resin plug set in place.

FIG. 4 shows the epoxy seal plug 13 installed above uppermost Portland cement plug 10a in the bore of the casing 3 and extending continuously therefrom into the annulus between casings 2, 3, ultimately into sealing contact with the inner wall of casing 2. The procedure for placement begins with proper formulation, also known in the art as the "design" of the epoxy resin and particulate composition to allow adequate mixing and placement time before setting, to produce a stable, non-settling slurry, and to ensure the resin is mixable with field blenders and pumpable with field pumps. The materials to be intermixed to form the epoxy seal plug 13 are gathered at the work location, mixed and pumped into the well through coiled tubing, jointed tubing, or by a dump bailer to form a column of sealant, in the casing bore and annulus, on the order of 20 to 30 feet in height. The epoxy resin is allowed to set in place and is then tested for seal integrity. Using a seal designed using the factors described herein results in a seal with a high degree of reliability as a result of the sealing material, or the sealed plug formed therewith, developing cracks therein, or pulling away from the adjacent metal of the casing, as a result of the sealing material shrinking after partially or fully hardening.

While the foregoing is directed to embodiments of the present invention, other and further embodiments of the invention may be devised without departing from the basic scope thereof, and the scope thereof is determined by the claims that follow.

We claim:

1. A method of sealing an opening in a well bore, comprising:
predicting or determining an ambient temperature at a sealing location of the well bore to be sealed;
formulating, based at least in part on an available delivery system for a sealant to seal the well at the sealing location thereof, a distance of the sealing location from a mixing location thereof, and the well bore temperature at the sealing location thereof, a composite sealant, the formulating of the composite sealant further comprising;
selecting a fluid material which undergoes an exothermic reaction to change the composite sealant from a fluid to a solid state; and
selecting and intermixing one or more solids with the fluid material to form the composite sealant, wherein the composite sealant has at least one of the following properties:
a thermal expansion factor of 45 or less;
an exothermic factor of 1.1 or less;
a heat flow factor of 5.5 or less;
a heat duration factor of 55 or less; or
a set time/cool down factor of 1.0 or less;
wherein the composite sealant can be located at the sealing location in the well bore before hardening of the composite sealant into the solid state.

2. The method of claim 1, further comprising:
selecting the fluid material and the one or more solids based on the wettability, mixability, and pumpability of the composite sealant.

3. The method of claim 2, wherein the composite sealant, as a result of the exothermic reaction of the fluid material, increases in temperature, and the composite sealant begins to harden into the solid state after a maximum temperature of the composite sealant has been reached.

4. The method of claim 1, wherein a rate of the exothermic reaction of the selected fluid material to harden into the solid state is dependent on the temperature of the fluid material.

5. The method of claim 1, wherein when the heat duration factor is 55 or less, the composite sealant formed of the fluid material and the one or more solids reaches a maximum temperature while having a bond development factor of P3 or less.

6. The method of claim 1, wherein the one or more solids comprise at least one of graphite, $Mn_3O_4$, manganese oxide, or Portland cement.

7. The method of claim 1, wherein the composite sealant has the following properties:
the thermal expansion factor is 45 or less;
the exothermic factor is 1.1 or less;
the heat flow factor is 5.5 or less;
the heat duration factor is 55 or less; and
the set time/cool down factor is 1.0 or less.

8. The method of claim 1, wherein the composite sealant achieves a shear bond after it reaches a maximum temperature.

9. The method of claim 1, wherein the one or more solids comprises at least one of hematite, silicon carbide, steel, barite, aluminum oxide, aluminum nitride, or sand.

10. The method of claim 1, wherein the one or more solids have at least one of:
a higher heat capacity than the fluid material;
a higher thermal conductivity than the fluid material; or
a lower coefficient of expansion than the fluid material.

11. The method of claim 1, wherein the composite sealant achieves a bond development factor of P4 to P6 at a time after a maximum temperature difference between the composite sealant and the ambient temperature in which the composite sealant is located has been reached.

12. The method of claim 1, wherein the fluid material comprises an epoxy resin and a hardener.

13. The method of claim 1, wherein the one or more solids comprises silicon carbide.

* * * * *